US012191060B2

(12) United States Patent
Abe et al.

(10) Patent No.: US 12,191,060 B2
(45) Date of Patent: Jan. 7, 2025

(54) SOFT MAGNETIC ALLOY, SOFT MAGNETIC ALLOY RIBBON, LAMINATE, AND MAGNETIC CORE

(71) Applicant: TDK CORPORATION, Tokyo (JP)

(72) Inventors: Kyotaro Abe, Tokyo (JP); Isao Nakahata, Tokyo (JP); Takuya Tsukahara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/893,463

(22) Filed: Aug. 23, 2022

(65) Prior Publication Data

US 2023/0079841 A1 Mar. 16, 2023

(30) Foreign Application Priority Data

Aug. 25, 2021 (JP) ................................ 2021-137465

(51) Int. Cl.

| | |
|---|---|
| ***H01F 1/153*** | (2006.01) |
| ***C22C 45/02*** | (2006.01) |
| ***H01F 3/04*** | (2006.01) |
| ***H01F 41/02*** | (2006.01) |

(52) U.S. Cl.

CPC ......... *H01F 1/15308* (2013.01); *C22C 45/02* (2013.01); *H01F 1/15333* (2013.01); *H01F 1/15341* (2013.01); *H01F 3/04* (2013.01); *H01F 41/0226* (2013.01); *C22C 2202/02* (2013.01)

(58) Field of Classification Search

None

See application file for complete search history.

(56) References Cited

U.S. PATENT DOCUMENTS

2020/0312499 A1* 10/2020 Kumaoka ........... H01F 1/15308

FOREIGN PATENT DOCUMENTS

JP 2018-049921 A 3/2018

OTHER PUBLICATIONS

Shah, 2nd International Conference on Condensed Matter and Applied Physics. AIP Conference Proceedings 1953, 120043 (2018). (Year: 2018).*

Chen, Acta Materialia, vol. 57, p. 4463-4472. (Year: 2009).*

Ozturk, J. Non-Crystalline Solids, vol. 527, No. 119745. (Year: 2020).*

* cited by examiner

*Primary Examiner* — Xiaowei Su

(74) *Attorney, Agent, or Firm* — Oliff PLC

(57) ABSTRACT

Provided a soft magnetic alloy ribbon containing Fe and B. Convex portions having an average convex portion height of 7 nm to 130 nm are present on an alloy surface.

14 Claims, 7 Drawing Sheets

SOFT MAGNETIC ALLOY, SOFT MAGNETIC ALLOY RIBBON, LAMINATE, AND MAGNETIC CORE

BACKGROUND OF THE INVENTION

Field of the Invention

The present invention relates to a soft magnetic alloy, a soft magnetic alloy ribbon, a laminate, and a magnetic core.

Description of the Related Art

As shown in, for example, Japanese Patent Laid-Open No. 2018-49921 (Patent Literature 1) below, it is known that a magnetic core is formed by laminating soft magnetic alloy ribbons. When the soft magnetic alloy ribbons are laminated, the soft magnetic alloy ribbons are laminated with a resin such as an adhesive interposed therebetween. By forming an insulating layer made of a resin or the like between the ribbons, it is possible to prevent an eddy current, particularly at a high frequency.

However, when a thickness of the resin layer interposed between the ribbons is too large, there is a problem that magnetic permeability of the magnetic core decreases.

SUMMARY OF THE INVENTION

The present invention has been made in view of such circumstances, and an object of the present invention is to provide a soft magnetic alloy that can uniformly and thinly coat a resin layer even when used in a laminated manner and can prevent a decrease in magnetic permeability at the time of forming a magnetic core, a soft magnetic alloy ribbon, a laminate, and a magnetic core.

The present inventors have focused on a surface state of a soft magnetic alloy, and have found that a coverage ratio of a resin with respect to an alloy surface can be increased and a decrease in magnetic permeability at the time of forming a magnetic core can be prevented by a convex portion having a predetermined range height appearing on the alloy surface, and thus have completed the present invention.

That is, a soft magnetic alloy according to the present invention is a soft magnetic alloy containing Fe and B, in which convex portions having an average convex portion height of 7 nm to 130 nm, preferably 10 nm or more and less than 100 nm, more preferably 35 nm to 97 nm, and particularly preferably 35 nm to 67 nm are present in a continuous pattern shape (including a mesh pattern shape) on an alloy surface.

It is considered that by forming such convex portions having a predetermined range height on the alloy surface, wettability of the surface is improved, and a coverage ratio of a resin is increased. It is considered that when a magnetic core using the soft magnetic alloy is formed by pressing, a crack starting from the convex portion is less likely to occur, and a decrease in magnetic permeability can be prevented at the time of forming.

An amount of B contained in the convex portions is preferably smaller than an amount of B inside the alloy. When the convex portion having the predetermined range height appearing on the alloy surface hardly contains B, a hardness of the convex portion is reduced, and when a core containing the soft magnetic alloy is formed by pressing, a crack starting from the convex portion is further less likely to occur, and deterioration of properties can be prevented.

An area ratio of the convex portions on the alloy surface is 15% or more and 100% or less and preferably 65% or more and 85% or less. Within such a range, particularly, a balance is excellent between the increase of the coverage ratio of the resin with respect to the alloy surface and an effect of preventing the decrease of the magnetic permeability at the time of forming the magnetic core.

A soft magnetic alloy ribbon according to the present invention contains the soft magnetic alloy described above. In the soft magnetic alloy ribbon according to the present invention, even a relatively thin resin film can cover the alloy surface of the ribbon with a relatively high coverage ratio, a laminated core can be formed by laminating the alloy ribbon via a thin resin film, and deterioration of properties during pressing can be prevented. A stacked body according to the present invention has a structure in which the soft magnetic alloy ribbon described above is stacked. The laminated structure may be a structure in which a single or a plurality of alloy ribbons is wound in a rotation direction, or a structure in which a plurality of alloy ribbons is laminated in a single direction.

A magnetic core according to the present invention includes the soft magnetic alloy described above.

DETAILED DESCRIPTION OF THE PREFERRED EMBODIMENTS

Hereinafter, the present invention will be described based on embodiments shown in drawings.

Figure 1:
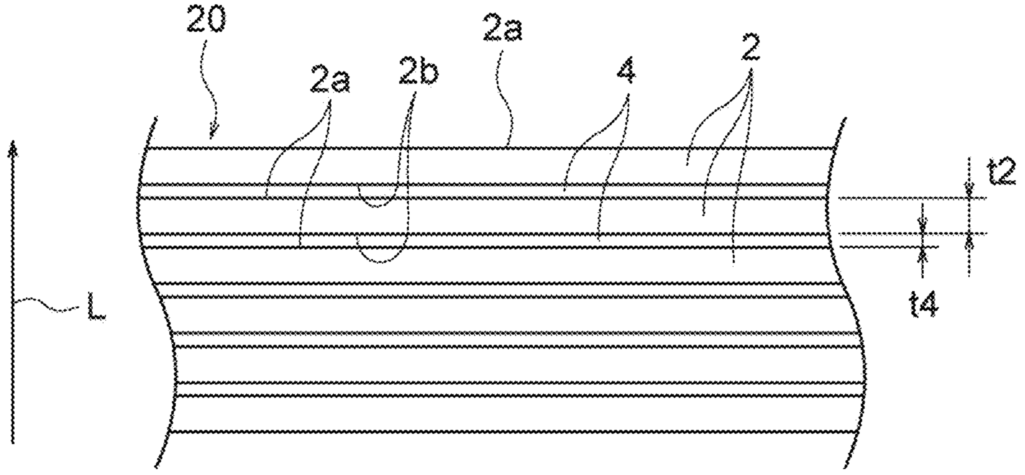
FIG. 1 is a schematic view of a laminate of soft magnetic alloy ribbons according to an embodiment of the present invention.

As shown in FIG. 1, a laminate(stacked body) 20 according to an embodiment of the present invention is used as, for example, a magnetic core. In the laminate 20, a plurality of soft magnetic alloy ribbons 2 is laminated with an adhesive layer 4 interposed therebetween. Each of the magnetic ribbons 2 has a first surface 2*a* and a second surface 2*b*, and in the embodiment, the magnetic ribbons 2 are laminated such that the first surface 2*a* and the second surface 2*b* of the adjacent magnetic ribbons 2 face each other with the adhesive layer 4 interposed therebetween. Such a laminating method is also referred to as normal laminating.

In the present embodiment, a thickness t2 of the magnetic ribbon 2 is not particularly limited, and is, for example, 5 μm to 150 μm, preferably 100 μm or less, and more preferably 10 μm to 50 μm, all the magnetic ribbons 2 have the same thickness, but may have different thicknesses. A thickness t4 of the adhesive layer 4 is not particularly limited, and is preferably 2 μm or less, 1 μm or less, 0.5 μm or less, more preferably 0.1 μm or less, and particularly preferably 0.05 μm or less. The thinner the adhesive layer is, the larger a proportion of the magnetic ribbon in the laminate is, and magnetic properties of the magnetic core are improved.

In the present embodiment, a resin constituting the adhesive layer 4 is not particularly limited, and examples thereof include an insulating resin such as an epoxy resin, a phenol resin, a silicone resin, and an acrylic resin.

Next, the magnetic ribbon 2 will be described in detail.

(Composition of Soft Magnetic Alloy Ribbon)

The soft magnetic alloy ribbon 2 according to the present embodiment contains a main component represented by a composition formula $(Fe_{(1-(\alpha+\beta))}X1_{\alpha}X2_{\beta})_{(1-(a+b+c+d+e+f))}M_aB_bP_cSi_dC_eS_f$, in which X1 is one or more selected from the group consisting of Co and Ni, X2 is one or more selected from the group consisting of Al, Mn, Ag, Zn, Sn, As, Sb, Cu, Cr, Bi, N, O, and a rare earth element, M is one or more selected from the group consisting of Nb, Hf, Zr, Ta, Mo, W, Ti, and V, $0 \le a \le 0.140$, $0.020 \le b \le 0.200$, $0 \le c \le 0.150$, $0 \le d \le 0.090$, $0 \le e \le 0.030$, $0 \le f \le 0.030$, $\alpha \ge 0$, $\beta \ge 0$, and $0 \le \alpha+\beta \le 0.50$ are satisfied.

At least one of a, c, and d is preferably larger than 0.

A soft magnetic alloy ribbon preferably has a structure containing Fe-based nanocrystals.

When the soft magnetic alloy ribbon having the above composition is subjected to heat treatment, Fe-based nanocrystals are likely to be deposited in the soft magnetic alloy ribbon 2. In other words, the soft magnetic alloy ribbon having the above composition is likely to be a raw material of the soft magnetic alloy ribbon 2 in which the Fe-based nanocrystals are deposited.

The soft magnetic alloy ribbon having the above composition before the heat treatment may have a structure formed of amorphous substances alone, or may have a nano-heterostructure in which initial microcrystals are present in amorphous substances. The initial microcrystals may have an average grain size of 0.3 nm to 10 nm. In the present embodiment, it is assumed that when an amorphization ratio is 85% or more, the soft magnetic alloy ribbon has the structure formed of amorphous substances alone or has the nano-heterostructure.

Here, the Fe-based nanocrystal refers to a crystal having a grain size of nano-order, and having a crystal structure of a nanocrystal containing Fe is a body-centered cubic lattice structure (bcc). In the present embodiment, Fe-based nanocrystals having an average grain size of 5 nm to 30 nm may be deposited. The soft magnetic alloy ribbon 2 in which such Fe-based nanocrystals are deposited is likely to have a high saturation magnetic flux density and low coercivity. In the present embodiment, in a case of a structure containing Fe-based nanocrystals, the amorphization ratio is less than 85%.

Hereinafter, a method for confirming whether the soft magnetic alloy ribbon has a structure formed of an amorphous phase (the structure formed of amorphous substances alone or the nano-heterostructure) or a structure formed of a crystalline phase will be described. In the present embodiment, the soft magnetic alloy ribbon having an amorphization ratio X of 85% or more represented by the following equation (1) has the structure formed of the amorphous phase, and the soft magnetic alloy ribbon having an amorphization ratio X of less than 85% has the structure formed of the crystalline phase.

$$X=100-(Ic/(Ic+Ia)\times 100) \quad (1)$$

Ic: crystalline scattering integrated intensity

Ia: amorphous scattering integrated intensity

The amorphization ratio X is calculated according to the above equation (1) by performing X-ray crystal structure analysis for the soft magnetic alloy ribbon by using X-ray diffraction (XRD), identifying a phase, reading a peak (Ic: crystalline scattering integrated intensity, Ia: amorphous scattering integrated intensity) of crystallized Fe or a compound, and calculating a crystallization ratio based on a peak intensity.

Hereinafter, each component of the soft magnetic alloy ribbon 2 according to the present embodiment will be described in detail.

M is one or more selected from the group consisting of Nb, Hf, Zr, Ta, Mo, W, Ti, and V.

For an amount (a) of M, $0 \le a \le 0.140$ is satisfied. That is, M may not be contained. For the amount (a) of M, $0.020 \le a \le 0.120$ is preferably satisfied, $0.040 \le a \le 0.100$ is more preferably satisfied, and $0.060 \le a \le 0.080$ is particularly preferably satisfied. When a is large, the saturation magnetic flux density is likely to decrease.

For an amount (b) of B, $0.020 \le b \le 0.200$ is satisfied. In addition, $0.025 \le b \le 0.200$ may be satisfied, $0.060 \le b \le 0.150$ is preferably satisfied, and $0.080 \le b \le 0.120$ is more preferably satisfied. When b is small, a crystalline phase formed by crystals having a grain size larger than 30 nm is likely to be generated in the soft magnetic alloy ribbon before the heat treatment, and when the crystalline phase is generated, the Fe-based nanocrystals cannot be deposited by the heat treatment. The coercivity is likely to increase. When b is large, the saturation magnetic flux density is likely to decrease.

For an amount (c) of P, $0 \le c \le 0.150$ is satisfied. That is, P may not be contained. In addition, $0.030 \le c \le 0.100$ is preferably satisfied, and $0.030 \le c \le 0.050$ is more preferably satisfied. When c is large, the saturation magnetic flux density is likely to decrease.

For an amount (d) of Si, $0 \le d \le 0.090$ is satisfied. That is, Si may not be contained. In addition, $0 \le d \le 0.020$ is preferably satisfied. By containing Si, the coercivity is likely to decrease. When d is large, the coercivity is likely to increase on the contrary.

For an amount (e) of C, $0 \le e \le 0.030$ is satisfied. That is, C may not be contained. In addition, $0.001 \le e \le 0.010$ is preferably satisfied. By containing C, the coercivity is likely to decrease. When e is large, the crystalline phase formed by the crystals having the grain size larger than 30 nm is likely to be generated in the soft magnetic alloy ribbon before the heat treatment, and when the crystalline phase is generated, the Fe-based nanocrystals cannot be deposited by the heat treatment. The coercivity is likely to increase.

For an amount (f) of S, $0 \le f \le 0.030$ is satisfied. That is, S may not be contained. When f is large, the crystalline phase formed by the crystals having the grain size larger than 30 nm is likely to be generated in the soft magnetic alloy ribbon before the heat treatment, and when the crystalline phase is generated, the Fe-based nanocrystals cannot be deposited by the heat treatment. The coercivity is likely to increase.

In the soft magnetic alloy ribbon according to the present embodiment, at least one of a, c, and d is larger than 0. That is, at least one of M, P, and Si is contained. The expression "at least one of a, c, and d is larger than 0" means that at least one of a, c, and d is 0.001 or more. At least one of a and c may be larger than 0. That is, at least one of M and P may be contained. Further, in consideration of significantly decreasing the coercivity, a is preferably larger than 0.

An amount $(1-(a+b+c+d+e+f))$ of Fe is not particularly limited, and may be $0.73 \le (1-(a+b+c+d+e+f)) \le 0.95$, or $0.73 \le (1-(a+b+c+d+e+f)) \le 0.91$. When $(1-(a+b+c+d+e+f))$ is within the above range, the crystalline phase formed by the crystals having the grain size larger than 30 nm is further less likely to be generated during manufacturing of the soft magnetic alloy ribbon.

In the soft magnetic alloy ribbon according to the present embodiment, a part of Fe may be substituted with X1 and/or X2.

X1 is one or more selected from the group consisting of Co and Ni. With respect to an amount of X1, $\alpha=0$ may be satisfied. That is, X1 may not be contained. The number of atoms of X1 is preferably 40 at % or less, with respect to a total number of atoms of 100 at % in the composition. That is, $0 \le \alpha\{1-(a+b+c+d+e+f)\} \le 0.40$ is preferably satisfied.

X2 is one or more selected from the group consisting of Al, Mn, Ag, Zn, Sn, As, Sb, Cu, Cr, Bi, N, O, and a rare earth element, With respect to an amount of X2, $\beta=0$ may be satisfied. That is, X2 may not be contained. The number of atoms of X2 is preferably 3.0 at % or less, with respect to a total number of atoms of 100 at % in the composition That is, $0 \le \beta\{1-(a+b+c+d+e+f)\} \le 0.030$ is preferably satisfied.

A range of a substitution amount for substituting Fe with X1 and/or X2 is preferably half or less of Fe on the basis of the number of atoms. That is, $0 \le \alpha+\beta \le 0.50$ is preferably satisfied.

The soft magnetic alloy ribbon according to the present embodiment may contain, as inevitable impurities, elements other than those described above. For example, the inevitable impurities may be contained in an amount of 0.1 wt % or less with respect to 100 wt % of the soft magnetic alloy ribbon.

(Surface Form of Soft Magnetic Alloy Ribbon)

Generally, when the soft magnetic alloy ribbon 2 is manufactured by a method using a roll such as a single-roll method, the soft magnetic alloy ribbon 2 has the first surface 2*a* (a surface contacting with a surface of the roll) and the second surface 2*b* (a surface not contacting with the surface of the roll). The first surface 2*a* and the second surface 2*b* are surfaces perpendicular to a thickness direction.

In the present embodiment, convex portions having an average convex portion height of 7 nm to 130 nm and preferably 10 nm or more and less than 100 nm (hereinafter, also referred to as convex portions having a predetermined range height) may appear in a continuous pattern shape (including a mesh pattern shape) on the first surface 2*a*, and the convex portions having the predetermined range height do not appear on the second surface 2*b*. However, in another embodiment of the present invention, the convex portions having the predetermined range height may appear on the second surface 2*b* alone, or the convex portions having the predetermined range height may appear on both the first surface 2*a* and the second surface 2*b*. In the following description, a case where the convex portions having the predetermined range height appear on an alloy surface as the first surface 2*a* alone and the convex portions having the predetermined range height do not appear on the second surface 2*b* will be described.

Figure 2:
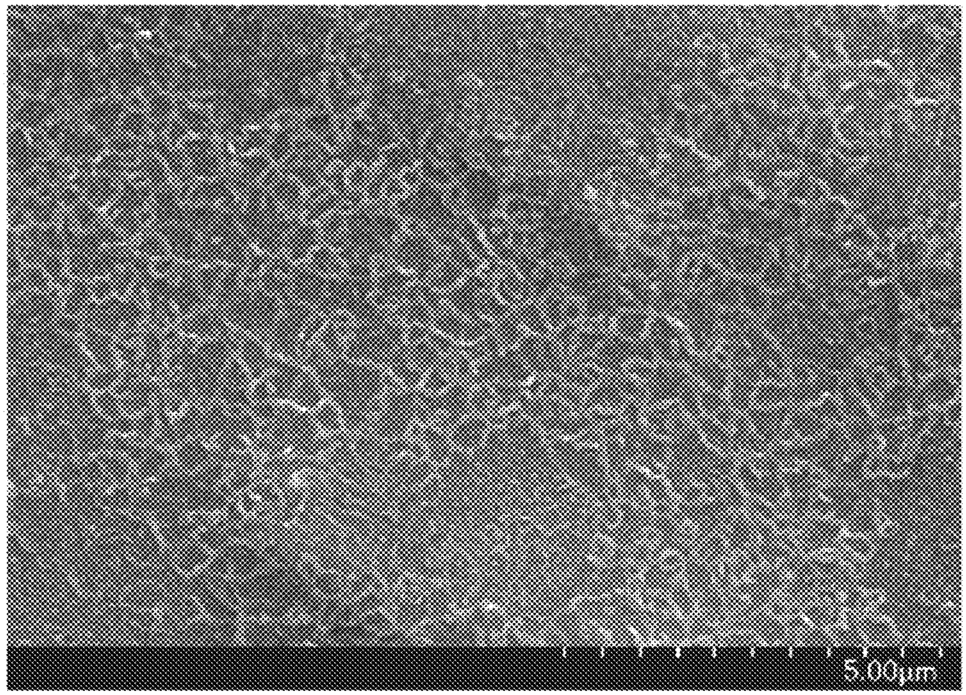
FIG. 2 is an example of a scanning electron microscope (SEM) image of a first surface of the soft magnetic alloy ribbon shown in FIG. 1.
Figure 5:
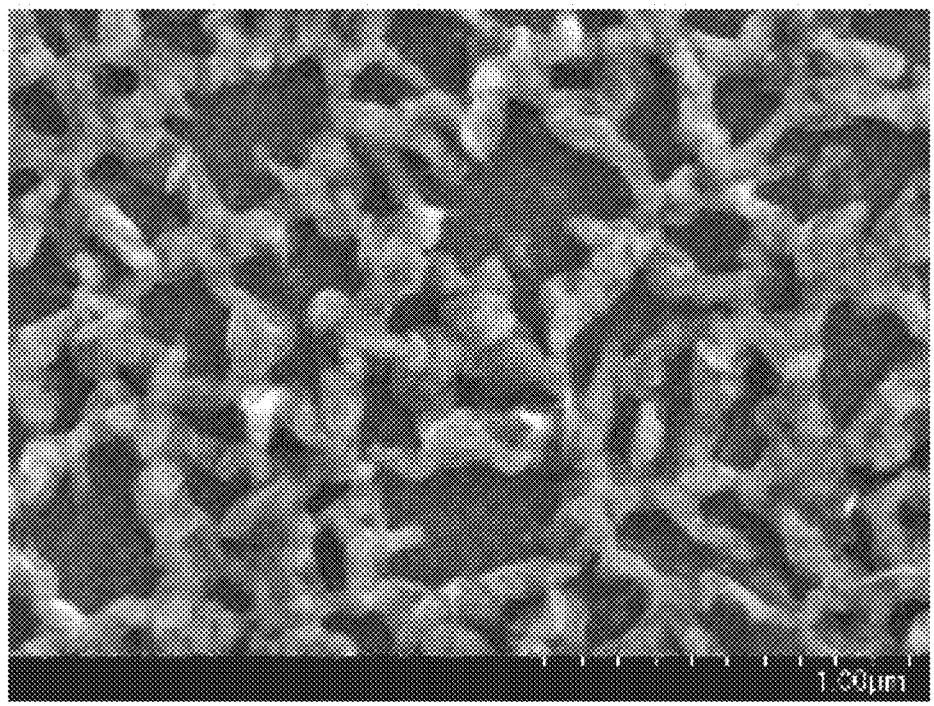
FIG. 5 is an SEM image showing an example of the present invention in which a part of the SEM image shown in FIG. 2 is enlarged.

When the first surface 2*a* of the soft magnetic alloy ribbon 2 according to the present embodiment is observed at a magnification of 10,000 times with, for example, a scanning electron microscope (SEM), as shown in FIG. 2, convex portions (white portions) are observed in a continuous pattern shape (including a mesh pattern shape). FIG. 5 shows an example of an SEM image in which convex portions (white portions) are further enlarged.

Figure 3:
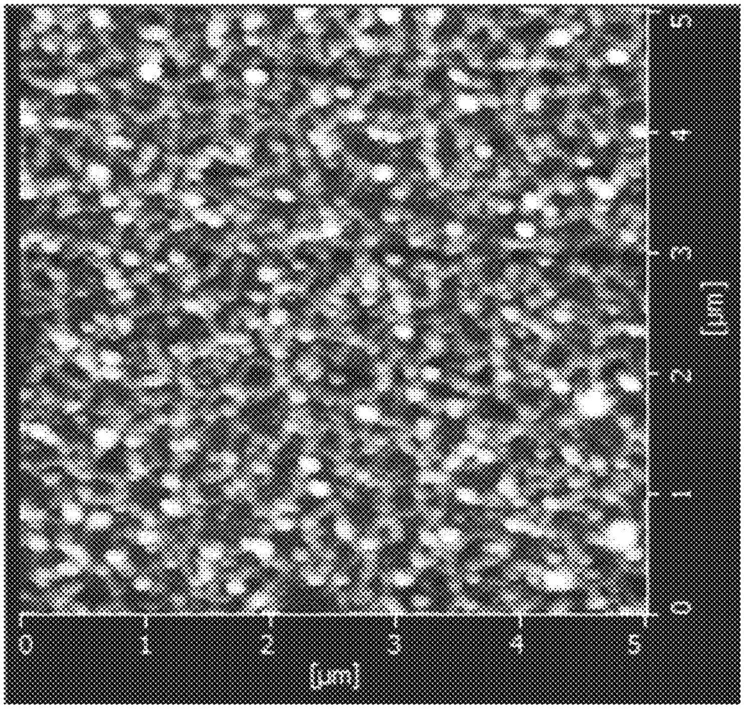
FIG. 3 is an example of an image obtained by imaging a part of the first surface with an atomic force microscope (AFM), which corresponds to the SEM image shown in FIG. 2.

As shown in FIG. 5, the convex portions having the predetermined range height are formed in a pattern shape which are continuous with each other, and concave surfaces recessed with respect to the convex portions are formed on the alloy surface surrounded by the continuous convex portions. A height of the convex portion shown in FIG. 5 can be calculated by imaging with, for example, an atomic force microscope (AFM) as shown in FIG. 3.

In the present embodiment, convex portions having an average convex portion height of 7 nm to 130 nm, preferably 10 nm or more and less than 100 nm, more preferably 35 nm to 97 nm, and particularly preferably 35 nm to 67 nm are present in a continuous pattern shape (including a mesh pattern shape) on the first surface 2*a* shown in FIG. 1. An area ratio of the convex portions on the first surface 2*a* is preferably 15% or more and 100% or less, and more preferably 65% or more and 85% or less.

In the present embodiment, an amount of B contained in the convex portion is smaller than an amount of B inside the alloy. By analyzing the soft magnetic alloy in which the convex portions having the predetermined range height appear on the alloy surface in a depth direction from the surface, it can be confirmed that in the vicinity of the alloy surface in which the convex portions having the predetermined range height appear, a sum (B+B−O) of a total amount of boron (B) and oxygen (O) (an amount of B−O) and an amount of B alone is at least ⅓ or less, ¼ or less, or less than ⅕ or less as compared with that inside the alloy, and is hardly detected (less than 0.1 at %). An amount of B+B-O inside the alloy is preferably 1.5 at % or more, more preferably 2 at % or more, and particularly preferably 3 at % or more. In the present embodiment, the inside of the alloy is a portion that is preferably deeper by 40 nm or more, more preferably deeper by 70 nm or more, or deeper by 140 nm or more in the depth direction from the alloy surface.

(Method for Manufacturing Soft Magnetic Alloy Ribbon)

Hereinafter, a method for manufacturing the soft magnetic alloy ribbon according to the present embodiment will be described.

The method for manufacturing the soft magnetic alloy ribbon according to the present embodiment is optional. For example, there is a method for manufacturing the soft magnetic alloy ribbon by a single-roll method. The ribbon may be a continuous ribbon.

In the single-roll method, first, pure metals of metal elements contained in a soft magnetic alloy ribbon to be finally obtained are prepared and weighed so as to have a composition same as that of the soft magnetic alloy ribbon to be finally obtained. Then, the pure metals of metal elements are melted and mixed to prepare a base alloy. A method for melting the pure metals is optional, and for example, there is a method for melting the pure metals by high-frequency heating after vacuum-evacuating the pure metals in a chamber. The base alloy and the soft magnetic alloy ribbon to be finally obtained usually have the same composition.

Next, the prepared base alloy is heated and melted to obtain a molten metal. A temperature of the molten metal is not particularly limited, and may be, for example, 1200° C. to 1500° C.

In the single-roll method according to the present embodiment, a ribbon is manufactured in a rotation direction of a rotating roll by injecting and supplying the molten metal from a nozzle toward the roll inside the chamber. In the present embodiment, a material of the roll is optional. For example, a roll made of Cu is used.

In the present embodiment, a temperature of the roll is not particularly limited, and is, for example, 5° C. to 30° C., and a differential pressure (an injection pressure) between an inside of the chamber and an inside of the injection nozzle is also not particularly limited, and is preferably, for example, 20 kPa to 80 kPa.

In the single-roll method, a thickness of the ribbon 2 to be obtained can be adjusted mainly by adjusting a rotation speed of the roll, but the thickness of the ribbon 2 to be obtained can also be adjusted by adjusting, for example, an interval between the nozzle and the roll, the temperature of the molten metal, or the like. When the injection pressure is small, the ribbon 2 may also be formed by adjusting the interval between the nozzle and the roll, the temperature of the molten metal, or the like.

A vapor pressure inside the chamber is not particularly limited. For example, the vapor pressure inside the chamber may be set to 11 hPa or less by using an Ar gas whose dew point is adjusted. A lower limit of the vapor pressure inside the chamber is not particularly present. The vapor pressure may be set to 1 hPa or less by filling the Ar gas whose dew point is adjusted, or the vapor pressure may be set to 1 hPa or less in a state close to a vacuum.

The soft magnetic alloy ribbon 2 before the heat treatment preferably does not contain crystals having a grain size larger than 30 nm. The soft magnetic alloy ribbon 2 before the heat treatment may have a structure formed of amorphous substances alone, or may have a nano-heterostructure in which initial microcrystals are present in amorphous substances.

A method for confirming whether crystals having a grain size larger than 30 nm are contained in the ribbon 2 is not particularly limited. For example, presence or absence of crystals having a grain size larger than 30 nm can be confirmed by normal X-ray diffraction measurement.

A method for observing presence or absence and an average grain size of the initial microcrystals is not particularly limited, and for example, the presence or absence and the average grain size of the initial microcrystals can be confirmed by using a transmission electron microscope to obtain a selected area diffraction image, a nanobeam diffraction image, a bright field image, or a high resolution image of a sample sliced by ion milling. In a case of using a selected area diffraction image or a nanobeam diffraction image, ring-shaped diffraction is formed when a diffraction pattern is amorphous, whereas a diffraction spot due to a crystal structure is formed when the diffraction pattern is not amorphous. In a case of using a bright field image or a high resolution image, the presence or absence and the average grain size of the initial microcrystals can be observed by visual observation at a magnification of $1.00\times10^5$ times to $3.00\times10^5$ times.

Next, the soft magnetic alloy ribbon 2 is subjected to the heat treatment. In the present embodiment, convex portions having a predetermined range height can be formed on the first surface 2*a* by the heat treatment for the first surface 2*a* (and/or the second surface 2*b*/hereinafter omitted) of the soft magnetic alloy ribbon 2 under a specific atmosphere. In the present embodiment, convex portions having a predetermined range height can be formed on the first surface 2*a* by performing second-stage in which heat treatment is performed at a predetermined temperature under an inert atmosphere after a first stage in which heat treatment is performed at a predetermined temperature under an active atmosphere. Examples of gases contained in the active atmosphere include hydrogen as a reduction active atmosphere and oxygen as an oxidation active atmosphere, and the air may also be used as the oxidation active atmosphere. Examples of gases contained in the inert atmosphere include nitrogen and argon, and a state of low oxygen concentration in which a small amount of oxygen is contained in these gases may also be used.

Conditions for the heat treatment in the first stage are such that under an atmosphere where a concentration of hydrogen gas is 1 vol % to 10 vol %, a heat treatment temperature is 200° C. to 500° C., and a heat treatment time is about 0.1 hours to 5 hours. Conditions for the heat treatment in the second stage are such that under an atmosphere where a concentration of oxygen gas is 0 vol % to 10 vol %, a heat treatment temperature is 200° C. to 500° C., and a heat treatment time is about 0.1 hours to 100 hours. In a case of such heat treatment conditions, it is easy to form the convex portions having the predetermined range height on the first surface 2*a*. When the heat treatment is performed at a temperature equal to or higher than a temperature at which Fe-based nanocrystals are deposited, Fe-based nanocrystals are deposited.

As the concentration of oxygen gas under the inert atmosphere is increased, a height of the convex portion tends to be increased, and an area ratio of the convex portion tends to be increased. As the heat treatment temperature is increased, the height of the convex portion tends to be increased, and the area ratio of the convex portion tends to be increased. Further, as the heat treatment time is increased, the height of the convex portion tends to be increased, and the area ratio of the convex portion tends to be increased.

In the above embodiment, the first surface 2*a* alone is exposed to the specific atmosphere and subjected to the heat treatment to form the convex portions having the predetermined range height on the first surface alone, but the second surface 2*b* may also be exposed to the specific atmosphere and subjected to the heat treatment. In this case, the convex portions having the predetermined range height can also be formed on the first surface 2*a* and/or the second surface 2*b*.

SUMMARY OF THE PRESENT EMBODIMENT

The soft magnetic alloy magnetic ribbon 2 according to the present embodiment has the convex portions having the average convex portion height in the predetermined range on the first surface 2*a* in the continuous pattern shape. By forming the convex portions having the predetermined range height on the first surface 2*a*, wettability of the surface is improved, and a coverage ratio of a resin constituting the adhesive layer 4 or the like is increased. When the soft magnetic alloy ribbon is formed into the laminate 20 by pressing, a crack starting from the convex portion is less likely to occur, and deterioration of properties can be prevented.

In the present embodiment, the amount of B contained in the convex portion is smaller than the amount of B inside the alloy. When the convex portion having the predetermined range height appearing on the alloy surface hardly contains B, a hardness of the convex portion is reduced, and when the soft magnetic alloy ribbon is formed into the laminate 20 by pressing, the crack starting from the convex portion is further less likely to occur, and the deterioration of the properties can be prevented.

Further, in the present embodiment, the area ratio of the convex portions on the first surface 2*a* is 15% or more and 100% or less and preferably 65% or more and 85% or less. Within such a range, particularly, a balance is excellent between the increase of the coverage ratio of the resin constituting the adhesive layer 4 with respect to the first surface 2*a* and an effect of preventing a decrease of magnetic permeability at the time of forming the magnetic core.

In the soft magnetic alloy ribbon 2 according to the present embodiment, even the adhesive layer 4 formed of a relatively thin resin film can cover the first surface 2*a* of the ribbon 2 with a relatively high coverage ratio, a core made from the laminate 20 can be formed by laminating the alloy ribbon 2 via the thin adhesive layer 4, and deterioration of properties during pressing can be prevented. In the present embodiment, a laminated structure of the laminate 20 may be a structure in which a single or a plurality of alloy ribbons 2 is wound in a rotation direction, or may be a structure in which a plurality of alloy ribbons 2 is laminated in the same lamination direction L as shown in FIG. 1.

Alternatively, a laminated structure (a so-called facing laminated structure) may be used in which a laminate having the second surfaces 2*b* of the adjacent alloy ribbons 2 facing each other and a laminate having the first surfaces 2*a* of the adjacent alloy ribbons 2 facing each other alternately appear along the lamination direction L.

The laminate 20 according to the above embodiments may be used for, for example, a motor, a transformer, a switching power supply, a resonant power supply, a high-frequency transformer, a noise filter, or a choke coil.

The present invention is not limited to the above embodiments, and various modifications can be made within the scope of the present invention. For example, instead of the adhesive layer 4, an insulating sheet made of an organic material such as plastic or rubber may be used.

EXAMPLES

Hereinafter, the present invention will be described based on more detailed Examples, but the present invention is not limited to these Examples.

Example 1

Raw material metals were weighed to obtain an alloy composition of $Fe_{82}Nb_{5.55}B_9P_{1.5}Si_2$, and melted by high-frequency heating to prepare a base alloy. Thereafter, the prepared base alloy was heated and melted to form a metal in a molten state at 1250° C., and the metal in the molten state was injected onto a roll by a single-roll method in which the roll was rotated at a rotation speed of 25 m/sec to prepare a ribbon. A material of the roll was Cu.

A roll temperature was set to 10° C. to 20° C. The differential pressure (the injection pressure) between the inside of the chamber and the inside of the injection nozzle was set to 30 kPa to 80 kPa. A thickness of an obtained soft magnetic alloy ribbon was set to 20 μm to 30 μm, and a length of the ribbon was set to several tens of meters.

After Fe-based nanocrystals were deposited, the two stages of heat treatment were performed on the soft magnetic alloy ribbon under the specific atmosphere. In the first stage, hydrogen gas having a concentration of 2 vol % in nitrogen was used, the heat treatment temperature was set to 300° C., and the heat treatment time was set to one hour. In the second stage, an oxygen gas having a concentration of 0.2 vol % in nitrogen was used, the heat treatment temperature was set to 400° C., and the heat treatment time was set to 1 hour.

When a surface (a first surface) of a ribbon sample after the heat treatment was observed with SEM, convex portions having a predetermined range height were observed. With respect to the surface of the same sample, an average convex portion height and an area ratio of the convex portions were calculated using AFM. Results are shown in Table 1.

In a case of determining presence or absence of a convex portion, the determination is made based on presence or absence of a local maximum portion in height distribution of a local region in AFM. For example, an AFM image shown in FIG. 3 is an observation result in a square region of 5 μm×5 μm, and a pattern shape is observed, but an influence of a sample inclination on the height distribution is not small when observing in such a wide region. Therefore, by limiting a region in which height distribution is to be observed to a local region and randomly selecting a predetermined number of local regions at intervals of 1 μm or more in an area of 10 μm×10 μm, it is possible to satisfactorily evaluate presence or absence, a height, and an area ratio of a very small convex portion, which are features of the present invention.

Figure 4:
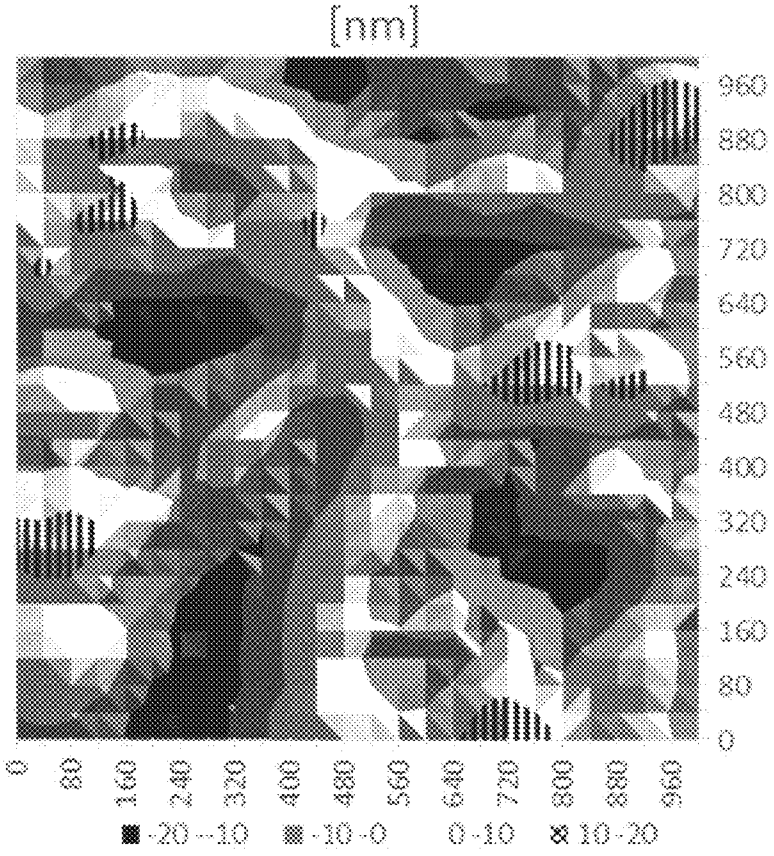
FIG. 4 is an explanatory drawing for confirming presence or absence of a convex portion based on the AFM image shown in FIG. 3.

Specifically, in a case of measuring an area ratio of a convex portion, first, a height is measured at intervals of 40 nm (26×26 points) with respect to a square region of 1 μm×1 μm using AFM, and presence or absence of the convex portion is confirmed based on distribution obtained by performing primary inclination correction on height distribution with respect to two vertical and horizontal axes. For example, when a local maximum value larger than a median value of the distribution by a predetermined value (for example, 10 nm) or more exists, it is determined that a convex portion is present in the region of 1 μm×1 μm, and when the local maximum value does not exist, it is determined that no convex portions are present in the region of 1 μm×1 μm. FIG. 4 shows an example showing a difference between a height of each point and the median value.

A convex portion height can be calculated as a standard deviation a of height distribution×4 (maximum−minimum corresponding to 95% of normal distribution). In an area of 10 μm×10 μm, 20 square regions of 1 μm×1 μm randomly selected at intervals of 1 μm or more are measured, and an average of heights of convex portions can be defined as an average convex portion height. In calculation of an area ratio of a convex portion, when there is a region in which a convex portion having a height higher than the median value of the distribution by a predetermined height (for example, 10 nm) or more is not present, an area of a convex portion height in the measurement region is calculated as 0. Further, a value obtained by dividing, with respect to a total number of measurement points, the number of measurement points at which a convex portion having a height higher than the median value of the distribution by a predetermined height (for example, 10 nm) or more can be confirmed by the total number of measurement points is defined as an area ratio of a convex portion.

In FIG. 4, in a region of 1 μm×1 μm, convex portions having a height higher than the median value of the distribution by 10 nm to 20 nm are shown by region portions of vertical stripes. These convex portions are formed in a continuous pattern shape with small convex portions having a height of 0 nm to 10 nm with respect to the median value of the distribution. Concave portions having a height of 0 nm to −10 nm and concave portions having a height of −10 nm to −20 nm with respect to the median value of the distribution are formed between the convex portions having the height higher than the median value of the distribution by 10 nm to 20 nm. In this way, when even one convex portion having a height higher than the median value of the distribution by 10 nm to 20 nm was observed in the region of 1 μm×1 μm, it is determined that the convex portion was observed, and the number of convex portions is counted in the calculation of the area ratio.

Figure 7:
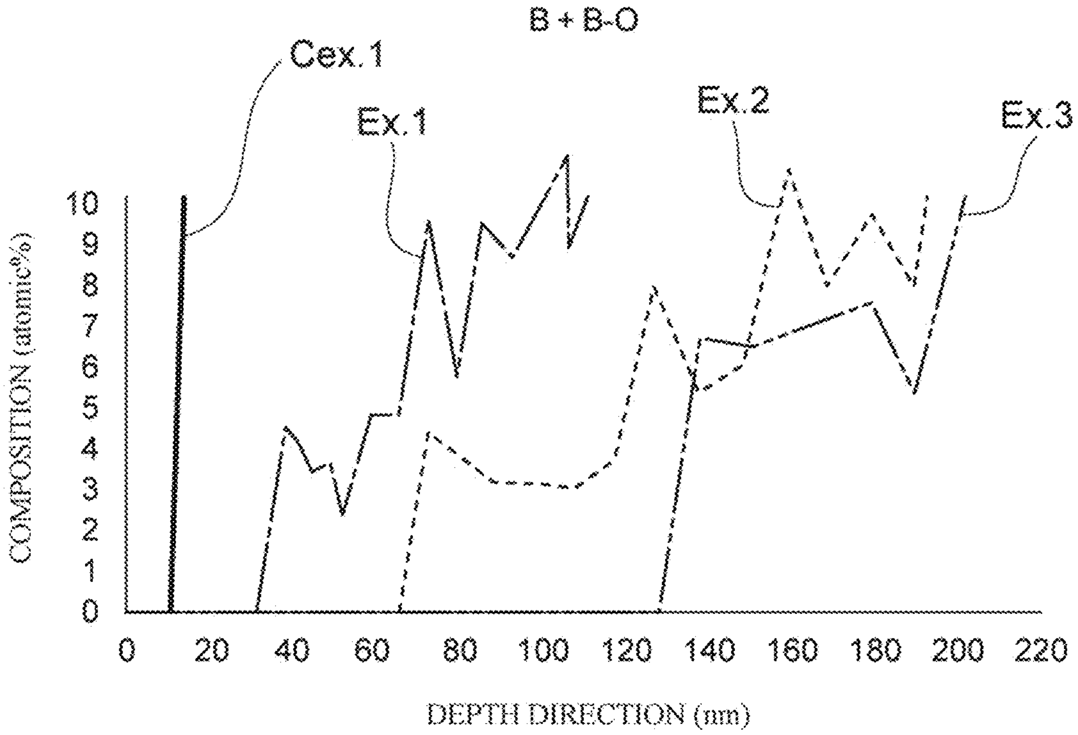
FIG. 7 is a graph showing an analysis result of an amount of B+B–O in a depth direction from a surface of each of soft magnetic alloy ribbons according to Examples and Comparative Examples of the present invention.

A sum (B+B−O) of a total amount of boron (B) and oxygen (O) (an amount of B−O) and an amount of B alone was calculated with X-ray photoelectron spectroscopy (XPS) in a depth direction from the surface of the ribbon sample in which the convex portions were formed. Results are shown in Ex.1 in FIG. 7. As shown in FIG. 7, it was confirmed that at a position at a depth of 10 nm from the surface, the amount of B+B−O was 0 at %, and the amount of B was also 0 at %. Table 1 shows values of at % of an amount of B at a position at a depth of 10 nm from a surface.

A resin made of epoxy was applied to the surface of the ribbon sample on which the convex portions were formed with a target thickness of 0.1 μm, and a coverage ratio of the resin on the surface of the ribbon sample was measured using a scanning confocal laser microscope. The coverage ratio of the resin was calculated by the following method. That is, in confocal observation by laser irradiation, interference fringes appear in a luminance image in a portion covered with a resin. Based on a luminance image observed in a region of 625 μm×625 μm with an objective lens of 20 times, the coverage ratio of the resin was obtained by calculating a proportion of a region in which interference fringes appeared. The coverage ratio was good at 40% or more and preferably 50% or more, and was evaluated as G and VG in coverage ratio determination. When the coverage ratio was less than 40%, the coverage ratio was determined as NG. A result is shown in Table 1.

Further, a laminated toroidal core was prepared by using the ribbon sample in which the convex portions were formed on the first surface. First, ribbon pieces were cut out from the ribbon such that each length in a casting direction was 60 mm. Next, a resin made of epoxy was applied to a surface of the cut ribbon piece with a target thickness of 0.1 μm, and every 10 ribbon pieces were laminated. The laminates were each punched into a toroidal shape having an outer diameter of 18 mm and an inner diameter of 10 mm. Thereafter, the laminates were pressed at a pressure of 1 t or 4 t per 1 $cm^2$ to form a plurality of laminate samples.

Magnetic permeability was measured for each of the laminate sample (a 4 t pressed body) pressed with the pressure of 4 t and the laminate sample (a 1 t pressed body) pressed with the pressure of it, and a ratio of the magnetic permeability of the 4 t pressed body to the magnetic permeability of the it pressed body (4 t pressed body/1 t pressed body) was calculated in terms of %. The ratio of the magnetic permeability was good at 60% or more and preferably 80% or more, and was evaluated as G and VG in magnetic permeability determination. When the ratio was less than 60%, the ratio was determined as NG. A result is shown in Table 1. The magnetic permeability was measured using an LCR meter and calculated based on inductance under conditions of 100 kHz and OSC 50 mV.

Example 2

A ribbon sample and laminate samples were formed in the same manner as in Example 1 except that the heat treatment was performed on the ribbon under the following conditions, and the same evaluation as in Example 1 was performed. Results are shown in Table 1. An SEM image of a first surface in Example 2 is shown in FIG. 5. Measurement results of an amount of B+B−O measured in a depth direction from the first surface in Example 2 are shown in Ex.2 in FIG. 7.

In Example 2, the oxygen concentration in the second stage was about 15 times the oxygen concentration in Example 1.

Example 3

Figure 6:
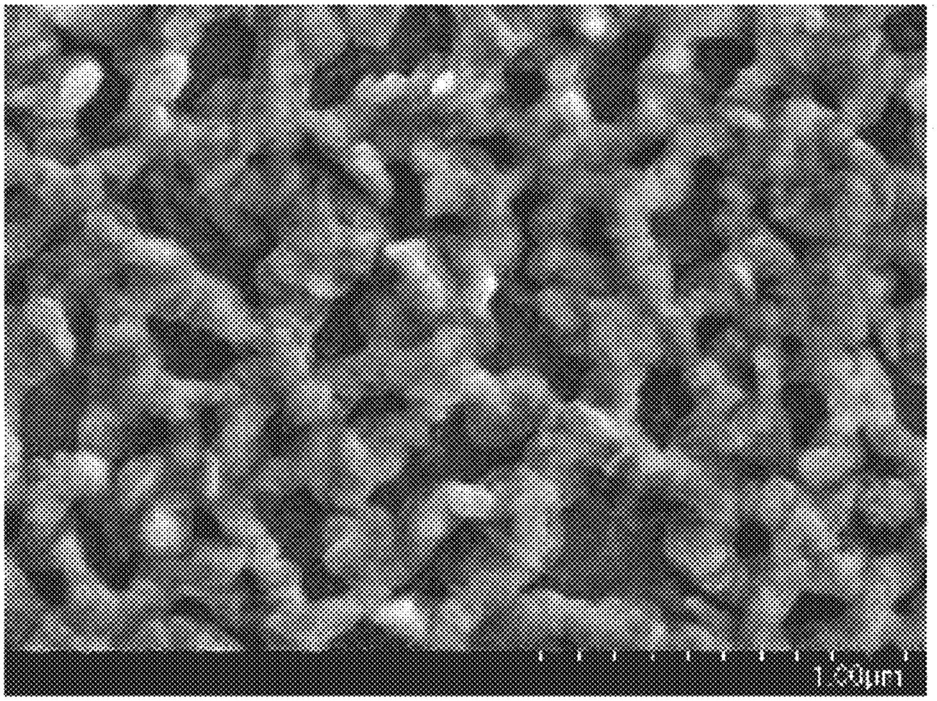
FIG. 6 is an enlarged SEM image with the same magnification as that of FIG. 5 according to another example of the present invention.

A ribbon sample and laminate samples were formed in the same manner as in Example 2 except that the heat treatment was performed on the ribbon under the following conditions, and the same evaluation as in Example 2 was performed. Results are shown in Table 1. An SEM image of a first surface in Example 3 is shown in FIG. 6. Measurement results of an amount of B+B−O measured in a depth direction from the first surface in Example 3 are shown in Ex.3 in FIG. 7.

In Example 3, the heat treatment time in the second stage was about seven times the heat treatment time in Example 2.

Comparative Example 1

A ribbon sample and laminate samples were formed in the same manner as in Example 1 except that the heat treatment was not performed on the ribbon, and the same evaluation as in Example 1 was performed. Results are shown in Table 1. Measurement results of an amount of B+B−O measured in a depth direction from a first surface in Comparative Example 1 are shown in Cex.1 in FIG. 7.

Example 10

A ribbon sample and laminate samples were formed in the same manner as in Example 2 except that the heat treatment was performed on the ribbon under the following conditions, and the same evaluation as in Example 2 was performed. Results are shown in Table 1.

In Example 10, the heat treatment temperature in the second stage was set to be lower than the heat treatment temperature in Example 2 by about 100° C.

Example 4

A ribbon sample and laminate samples were formed in the same manner as in Example 2 except that the heat treatment was performed on the ribbon under the following conditions, and the same evaluation as in Example 2 was performed. Results are shown in Table 1.

In Example 4, the heat treatment time in the second stage was about 50 times the heat treatment time in Example 2.

Example 5

A ribbon sample and laminate samples were formed in the same manner as in Example 2 except that raw material metals were weighed to obtain an alloy composition of $Fe_{79}B_{13}Cu_2Si_{5.5}$, and the same evaluation as in Example 2 was performed. Results are shown in Table 1.

Example 6

A ribbon sample and laminate samples were formed in the same manner as in Example 2 except that raw material metals were weighed to obtain an alloy composition of $Fe_{75}Nb_3B_6Cu_1Si_{15}$, and the same evaluation as in Example 2 was performed. Results are shown in Table 1.

Example 11

A ribbon sample and laminate samples were formed in the same manner as in Example 4 except that the heat treatment was performed on the ribbon under the following conditions, and the same evaluation as in Example 4 was performed. Results are shown in Table 1.

In Example 11, the heat treatment time in the second stage was about twice the heat treatment time in Example 4.

Example 12

A ribbon sample and laminate samples were formed in the same manner as in Example 11 except that the heat treatment was performed on the ribbon under the following conditions, and the same evaluation as in Example 11 was performed. Results are shown in Table 1.

In Example 12, the heat treatment time in the second stage was about twice the heat treatment time in Example 11.

Comparative Example 2

A ribbon sample and laminate samples were formed in the same manner as in Example 12 except that the heat treatment was performed on the ribbon under the following conditions, and the same evaluation as in Example 12 was performed. Results are shown in Table 1.

In Comparative Example 2, the heat treatment temperature in the second stage was set to be higher than the heat treatment temperature in Example 12 by about 50° C., and the oxygen concentration in the second stage was about five times the oxygen concentration in Example 12.

Example 7

A ribbon sample and laminate samples were formed in the same manner as in Example 1 except that a first surface of the ribbon was subjected to blast treatment with alundum instead of performing the heat treatment on the ribbon, and the same evaluation as in Example 1 was performed. Results are shown in Table 1.

Evaluation

As shown in Table 1, as compared with Comparative Examples 1 and 2, in Examples 1 to 7 and 10 to 12, it was confirmed that by forming the convex portions having the predetermined range height on the alloy surface at the predetermined height, the wettability of the surface was improved, and the coverage ratio of the resin was increased even when a resin layer was as thin as about 0.1 μm or less. It was confirmed that the ratio of the magnetic permeability was increased in Examples 1 to 7 and 10 to 12 as compared with Comparative Example 2. The reason is considered to be that when the magnetic core is formed by pressing, the crack starting from the convex portion is less likely to occur, and the decrease in magnetic permeability can be prevented.

In the present embodiment, the amount of B contained in the convex portion is smaller than the amount of B inside the alloy. It is considered that when the convex portion having the predetermined range height appearing on the alloy surface does not contain B, the hardness of the convex portion is reduced, and when the soft magnetic alloy ribbon is formed into the laminate by pressing, the crack starting from the convex portion is further less likely to occur, and the deterioration of the properties can be prevented.

Further, in Examples, it was confirmed that when the area ratio of the convex portions on the alloy surface was 15% or more and 100% or less and preferably 65% or more and 85% or less, a balance between the increase of the coverage ratio of the resin and the increase of the magnetic permeability was particularly excellent.

TABLE 1

| | | Subject Item | Ribbon Average convex portion height [nm] | Ribbon Area ratio of convex portion [%] | Ribbon Amount of B at position at depth of 10 nm from surface [at %] |
|---|---|---|---|---|---|
| Comparative Example 1 | $Fe_{82}Nb_{5.5}B_9P_{1.5}Si_2$ | Untreated | 2 | 5 | 7 |
| Example 10 | $Fe_{82}Nb_{5.5}B_9P_{1.5}Si_2$ | Yes | 7 | 10 | 0 |
| Example 1 | $Fe_{82}Nb_{5.5}B_9P_{1.5}Si_2$ | Yes | 10 | 15 | 0 |
| Example 2 | $Fe_{82}Nb_{5.5}B_9P_{1.5}Si_2$ | Yes | 35 | 65 | 0 |
| Example 3 | $Fe_{82}Nb_{5.5}B_9P_{1.5}Si_2$ | Yes | 67 | 85 | 0 |
| Example 4 | $Fe_{82}Nb_{5.5}B_9P_{1.5}Si_2$ | Yes | 97 | 100 | 0 |
| Example 11 | $Fe_{82}Nb_{5.5}B_9P_{1.5}Si_2$ | Yes | 105 | 95 | 0 |
| Example 12 | $Fe_{82}Nb_{5.5}B_9P_{1.5}Si_2$ | Yes | 129 | 100 | 0 |
| Comparative Example 2 | $Fe_{82}Nb_{5.5}B_9P_{1.5}Si_2$ | Yes | 620 | 95 | 0 |
| Example 7 | $Fe_{82}Nb_{5.5}B_9P_{1.5}Si_2$ | Blast | 74 | 90 | 6 |
| Example 5 | $Fe_{79}B_{13.5}Cu_2Si_{5.5}$ | Yes | 31 | 60 | 0 |
| Example 6 | $Fe_{75}Nb_3B_6Cu_1Si_{15}$ | Yes | 38 | 35 | 0 |

| Ribbon Coverage ratio of resin film | Ribbon Determination for coverage ratio of resin film | Laminated toroidal core Ratio of magnetic permeability 4t pressed body/ 1t pressed body | Laminated toroidal core Determination for ratio of magnetic permeability |
|---|---|---|---|

TABLE 1-continued

| | | | | | |
|---|---|---|---|---|---|
| Comparative Example 1 | $Fe_{82}Nb_{5.5}B_9P_{1.5}Si_2$ | 28% | NG | 121% | VG |
| Example 10 | $Fe_{82}Nb_{5.5}B_9P_{1.5}Si_2$ | 43% | G | 119% | VG |
| Example 1 | $Fe_{82}Nb_{5.5}B_9P_{1.5}Si_2$ | 52% | VG | 120% | VG |
| Example 2 | $Fe_{82}Nb_{5.5}B_9P_{1.5}Si_2$ | 61% | VG | 115% | VG |
| Example 3 | $Fe_{82}Nb_{5.5}B_9P_{1.5}Si_2$ | 65% | VG | 116% | VG |
| Example 4 | $Fe_{82}Nb_{5.5}B_9P_{1.5}Si_2$ | 71% | VG | 86% | VG |
| Example 11 | $Fe_{82}Nb_{5.5}B_9P_{1.5}Si_2$ | 59% | VG | 78% | G |
| Example 12 | $Fe_{82}Nb_{5.5}B_9P_{1.5}Si_2$ | 48% | G | 66% | G |
| Comparative Example 2 | $Fe_{82}Nb_{5.5}B_9P_{1.5}Si_2$ | 22% | NG | 53% | NG |
| Example 7 | $Fe_{82}Nb_{5.5}B_9P_{1.5}Si_2$ | 63% | VG | 75% | G |
| Example 5 | $Fe_{79}B_{13.5}Cu_2Si_{5.5}$ | 62% | VG | 116% | VG |
| Example 6 | $Fe_{75}Nb_3B_6Cu_1Si_{15}$ | 59% | VG | 123% | VG |

REFERENCE SIGNS LIST

2 (soft magnetic alloy) ribbon
**2*a*** first surface
**2*b*** second surface
4 adhesive layer
laminate(stacked body)

What is claimed is:

1. A soft magnetic alloy, comprising Fe and B, wherein the soft magnetic alloy has a structure containing Fe-based nanocrystals, convex portions having an average convex portion height of 7 nm to 130 nm are present in a continuous pattern shape on an alloy surface, and an amount of B contained in the convex portions is smaller than an amount of B inside the alloy, and at a position of a depth of 10 nm from the alloy surface on the convex portions, a sum (B+B–O) of the total amount of boron (B) and oxygen (O) (an amount of B–O) and an amount of B alone in atomic % is ⅓ or less as compared with that inside the alloy.

2. The soft magnetic alloy according to claim 1, wherein an area ratio of the convex portions on the alloy surface is 15% or more and 100% or less.

3. A soft magnetic alloy ribbon, comprising the soft magnetic alloy according to claim 1.

4. A stacked body having a structure in which the soft magnetic alloy ribbon according to claim 3 is stacked.

5. A magnetic core, comprising the soft magnetic alloy according to claim 1.

6. The soft magnetic alloy according to claim 1, wherein the average convex portion height is 10 nm or more and less than 100 nm.

7. The soft magnetic alloy according to claim 1, wherein the average convex portion height is 35 nm to 97 nm.

8. The soft magnetic alloy according to claim 1, wherein the average convex portion height is 35 nm to 67 nm.

9. The soft magnetic alloy according to claim 1, having the formula $(Fe_{(1-(\alpha+\beta))}X1_{\alpha}X2_{\beta})_{(1-(a+b+c+d+e+f))}M_aB_bP_cSi_dC_eS_f$, in which X1 is one or more selected from the group consisting of Co and Ni, X2 is one or more selected from the group consisting of Al, Mn, Ag, Zn, Sn, As, Sb, Cu, Cr, Bi, N, O, and a rare earth element, M is one or more selected from the group consisting of Nb, Hf, Zr, Ta, Mo, W, Ti, and V, $0 \le a \le 0.140$,
$0.020 \le b \le 0.200$,
$0 \le c \le 0.150$,
$0 \le d \le 0.090$,
$0 \le e \le 0.030$,
$0 \le f \le 0.030$,
$\alpha \ge 0$,
$\beta \ge 0$, and
$0 \le \alpha+\beta \le 0.50$ are satisfied.

10. The soft magnetic alloy according to claim 9, wherein at least one of a, c, and d is larger than 0.

11. The soft magnetic alloy according to claim 9, wherein
$0.060 \le a \le 0.080$,
$0.080 \le b \le 0.120$,
$0.030 \le c \le 0.050$,
$0 \le d \le 0.020$,
$0.001 \le e \le 0.010$.

12. The soft magnetic alloy according to claim 9, consisting of Fe, Nb, B, P and Si.

13. A soft magnetic alloy, having the formula $(Fe_{(1-(\alpha+\beta))}X1_{\alpha}X2_{\beta})_{(1-(a+b+c+d+e+f))}M_aB_bP_cSi_dC_eS_f$, wherein the soft magnetic alloy has a structure containing Fe-based nanocrystals, convex portions having an average convex portion height of 7 nm to 130 nm are present in a continuous pattern shape on an alloy surface, an amount of B contained in the convex portions is smaller than an amount of B inside the alloy, X1 is one or more selected from the group consisting of Co and Ni, X2 is one or more selected from the group consisting of Al, Mn, Ag, Zn, Sn, As, Sb, Cu, Cr, Bi, N, O, and a rare earth element, M is one or more selected from the group consisting of Nb, Hf, Zr, Ta, Mo, W, Ti, and V, and $0.060 \le a \le 0.080$,
$0.080 \le b \le 0.120$,
$0.030 \le c \le 0.050$,
$0 \le d \le 0.020$,
$0.001 \le e \le 0.010$,
$0 \le f \le 0.030$,
$\alpha \ge 0$,
$\beta \ge 0$, and
$0 \le \alpha+\beta \le 0.50$ are satisfied.

14. A soft magnetic alloy having the formula $Fe_{(1-(a+b+c+d))}Nb_aB_bP_cSi_d$, wherein the soft magnetic alloy has a structure containing Fe-based nanocrystals, convex portions having an average convex portion height of 7 nm to 130 nm are present in a continuous pattern shape on an alloy surface, an amount of B contained in the convex portions is smaller than an amount of B inside the alloy, and $0 \leq a \leq 0.140$, $0.020 \leq b \leq 0.200$, $0 \leq c \leq 0.150$, and $0 \leq d \leq 0.090$ are satisfied.

* * * * *